(12) United States Patent
Nguyen et al.

(10) Patent No.: US 10,775,859 B2
(45) Date of Patent: Sep. 15, 2020

(54) ASSIGNMENT OF CORE IDENTIFIER

(71) Applicant: HEWLETT PACKARD ENTERPRISE DEVELOPMENT LP, Houston, TX (US)

(72) Inventors: Vincent Nguyen, Houston, TX (US); Michael T. Gill, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 163 days.

(21) Appl. No.: 15/273,860

(22) Filed: Sep. 23, 2016

(65) Prior Publication Data

US 2018/0088638 A1 Mar. 29, 2018

(51) Int. Cl.
| | | |
|---|---|---|
| *G06F 1/20* | (2006.01) | |
| *G06F 9/445* | (2018.01) | |
| *G06F 1/3203* | (2019.01) | |
| *G06F 1/3206* | (2019.01) | |
| *G06F 9/52* | (2006.01) | |
| *G06F 9/46* | (2006.01) | |
| *G06F 9/48* | (2006.01) | |

(52) U.S. Cl.
CPC ............ *G06F 1/206* (2013.01); *G06F 1/3203* (2013.01); *G06F 1/3206* (2013.01); *G06F 9/44505* (2013.01); *G06F 9/46* (2013.01); *G06F 9/52* (2013.01)

(58) Field of Classification Search
CPC ........ G06F 1/206; G06F 9/44505; G06F 9/52; G06F 1/3203; G06F 9/46
See application file for complete search history.

(56) References Cited

U.S. PATENT DOCUMENTS

| | | | |
|---|---|---|---|
| 6,308,279 B1 * | 10/2001 | Toll ........................ | G06F 1/3203 713/323 |
| 6,480,966 B1 * | 11/2002 | Rawson, III .............. | G06F 9/54 710/260 |
| 6,698,017 B1 * | 2/2004 | Adamovits ............. | G06F 8/656 717/168 |
| 2007/0079150 A1 * | 4/2007 | Belmont ................ | G06F 1/3228 713/300 |
| 2007/0174685 A1 * | 7/2007 | Banks .................. | G06F 11/1658 714/12 |
| 2010/0146513 A1 * | 6/2010 | Song ...................... | G06F 1/3203 718/104 |
| 2013/0031342 A1 * | 1/2013 | French ................... | G06F 9/4418 713/2 |
| 2013/0067132 A1 * | 3/2013 | Guddeti ................... | G06F 13/24 710/260 |
| 2016/0252943 A1 * | 9/2016 | Varma ..................... | G06F 15/00 713/310 |
| 2017/0177407 A1 * | 6/2017 | Therien ................. | G06F 1/3287 |

* cited by examiner

*Primary Examiner* — Jaweed A Abbaszadeh
*Assistant Examiner* — Gayathri Sampath
(74) *Attorney, Agent, or Firm* — Hewlett Packard Enterprise Patent Department

(57) ABSTRACT

A method may include assigning a core identifier of an active core to an idle core. After synchronizing the active core and idle core, the active core is inactivated.

19 Claims, 4 Drawing Sheets

ASSIGNMENT OF CORE IDENTIFIER

BACKGROUND

Thermal stress is a major factor in the lifespan of a processor. Various techniques are used to limit the thermal stress placed on processors, such as heat sinks, forced air cooling, liquid cooling, and throttling. Additionally, thermal stress places operational limits on processors. For example, thermal effects may require processors to run at lower frequencies when executing vector instructions such as Advanced Vector Extensions (AVX) instructions when compared to scalar instructions.

BRIEF DESCRIPTION OF THE DRAWINGS

Certain examples are described in the following detailed description and in reference to the drawings, in which.

DETAILED DESCRIPTION OF SPECIFIC EXAMPLES

Implementations of the disclosed technology allow processes or threads to be migrated from active cores to inactive cores within a multi-core processor. The migration may be performed in a manner that is transparent to the operating system (OS). Migrating cores may mitigate against thermal hotspots formed by unevenly distributed workloads amongst the cores of the processor. In addition to extending the lifespan of the processor and reducing the likelihood of failure within a warranty period, this may improve the performance of the processor. For example, a processor performing core migration may be able to execute AVX instructions at the same speed it executes scalar instructions. Additionally, core migration may allow reduction in thermal management techniques. For example, core migration may allow removal of fans in systems that would otherwise require them.

Figure 1:
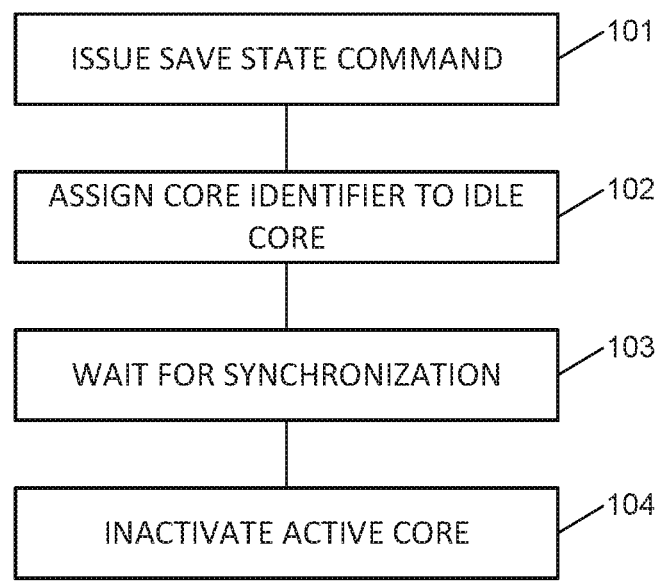
FIG. 1 illustrates an example of core migration within a multi-core processor.

FIG. 1 illustrates an example of core migration within a multi-core processor. For example, the method may be performed by a power control unit (PCU) of the multi-core processor, an innovation engine (IE) of the processor or chipset, another management agent, such as a baseboard management controller (BMC), or other out-of-band microprocessor able to execute management firmware.

In this example, the processor has a set number of active cores and a number of idle cores. An N-core processor may have between 1 and N−1 active cores, with the complement being idle. The number n of available active cores may be set during initial system configuration or during boot. This number n is the number of cores visible to the OS. For example, in a 64 core processor, with a 1:1 ratio of active to inactive cores, the processor would appear to be a 32 core processor.

In this method, threads running on an active core are moved to a previously idle core. The previously idle core then becomes the new active core and the previously active core is placed into an inactive state. This example method may be performed in a manner that is transparent to an OS running on the processor and any applications running on the OS such that the OS and applications are unaware that threads executing on an initial core are moved to a new core.

The method includes block 101. Block 101 may include issuing a save state command to an active core. The save state command may cause the processor to store the active core's current state information, such as its architectural state and its private cache contents to memory, a shared cache, such as the lowest level cache (LLC), or some other shared location.

The active core has a core identifier, which identifies the core to the OS. For example, the core identifier may be an Advanced Programmable Interrupt Controller identifier (APIC ID). Block 102 may include assigning the core identifier to an idle core. For example, each core of the processor may have a register that stores its core ID. Block 102 may include writing the core ID of the active core to the ID register of the idle core that will be replacing the active core. Alternatively, block 102 may include instructing an agent to write the core ID to the idle core's ID register. Block 102 may further comprise activating the previously idle core or instructing the PCU to activate the previously idle core.

In some implementations, block 102 may include selecting the idle core from a set of idle cores. For example, the idle core may be selected based on temperature of the idle core. For example, the coolest core within the set of idle cores could be selected. In this example, the temperature data may be received from temperature sensors within the processor and used to maintain a thermal profile of the processor. For example, each core may have one or more temperature sensors, and the thermal profile may be a listing of the temperatures of each core. As another example, temperature sensors may be dispersed throughout the processor without each core having its own sensor. In this example, information regarding the layout of the cores and the sensors can be used to estimate the temperature of each core. For example, the temperature of a particular core could be estimated by averaging the temperature readings of the sensors near the core, weighted by the distances of the sensors to the core.

As another example, block 102 may include selecting the idle core from the set of idle cores based on distance between the idle core and the active core. Cores farther from the active core are likely outside of a hotspot created by the active core. Accordingly, selecting a distal from the currently active core can provide better thermal headroom. For example, layout information may be used to determine the idle core that is farthest from the active core. This idle core may then be selected as the replacement core.

In further examples, the idle core can be selected based on distance and temperature. For example, the idle core can be selected as the core that is farthest from the active core that also has a temperature less than a selection threshold temperature. As another example, the idle core can be selected as the coolest core that is at least a threshold distance from the active core.

In still further examples, the idle core can be selected based on a predetermined pattern or policy. For example, in a system with one idle core for each active core, pairs may be formed such that any cores always switch with the other element of their pair. As another example, a round-robin pattern or shuffling pattern may move processes or threads around the processor in a predetermined manner.

The method further includes block 103. Block 103 may include waiting for the active core and the idle core to synchronize. During block 103 both cores are active with the same core ID. For example, they may be operated in a master-slave relationship with the originally active core as the master and the originally idle core as the slave. With the same core ID, both cores are mapped to the same state information and LLC cache contents creating in block 101. Additionally, both cores are issued the same instructions by the processor. Accordingly, both cores will eventually synchronize their states and will be executing the same instructions. For example, block 103 may comprise waiting for both cores to have the same program counter (PC). For example, the processor may signal the agent performing the method that the cores have the same program counter or that they are otherwise in sync. As another example, the agent may have access to the monitor the cores' PCs and can determine their synchronization state itself.

The method further includes block 104. Block 104 may include placing the active core into an inactive state. For example, block 104 may include placing the core into a C6 inactivation state. Block 104 may include placing the active core into the set of idle cores to be used for subsequent core migrations. After block 104, the previously idle core is now the only core operating with the active core ID and is executing the corresponding threads without interruption to OS or running programs.

Figure 2:
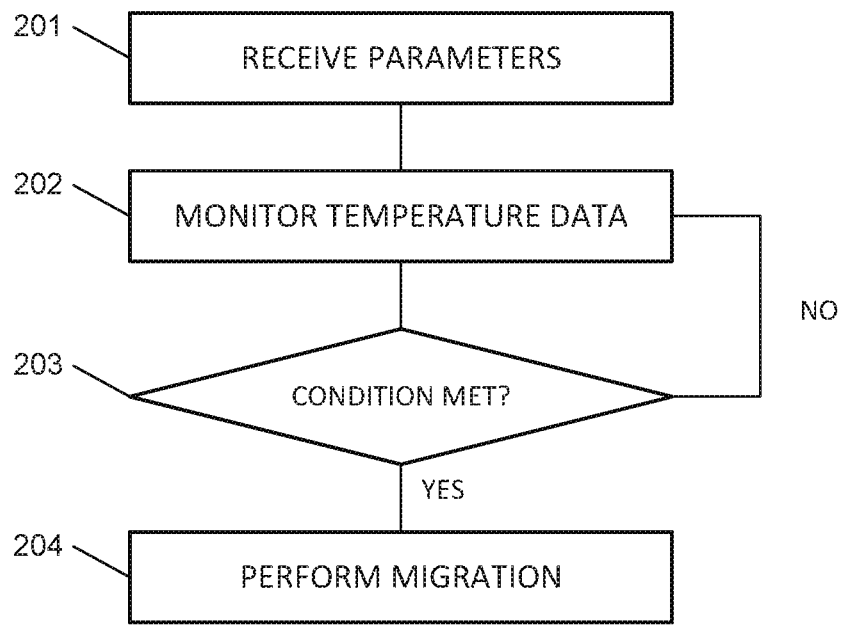
FIG. 2 illustrates an example method of performing migration based on temperature conditions.

In some implementations, core migration may be performed based on temperature conditions. FIG. 2 illustrates an example method of performing migration based on temperature conditions.

The method includes block 201. In block 201, parameters for the core migration are received. For example, the parameters may be received from a management controller, such as a baseboard management controller. The parameters may include the numbers of active cores and idle cores, the policies for selecting idle cores, thresholds, core layout information, and other operational parameters.

In some implementations, block 201 may include receiving updated parameters during system operation. For example, during system operation there may be a hot add or removal of processor cores. For example, block 201 may include receiving core addition or removal commands from the OS. In these examples, the number of active and idle cores may be updated to reflect the hot add or removal of cores. Commands to update the numbers of active or idle cores may be received from the OS, out-of-band management processor, may be determined programmatically, or through other methods.

The method further includes block 202. Block 202 may include monitoring temperature data of the processor. For example, block 202 may include monitoring the temperature of the processor cores. As described above, in some cases each core has one or more processors. This these cases, block 202 may include individually monitoring each core's temperature. In other cases, the temperature sensors may be dispersed throughout the processor in a particular layout such that each core does not have a dedicated sensor. In these cases, block 202 may include estimating each core's temperature based on processor layout information such as layout of the core and the layout of the temperature sensors, and the temperature data read from the sensors.

The method further includes block 203. Block 203 includes determining if any of the active cores meet a threshold temperature condition. For example, block 203 may include detecting that an active core has a temperature that exceeds a threshold temperature. If so, then the method proceeds to block 204 to perform a core migration for that active core. The method of core migration may be performed as described with respect to FIG. 1.

Figure 3:
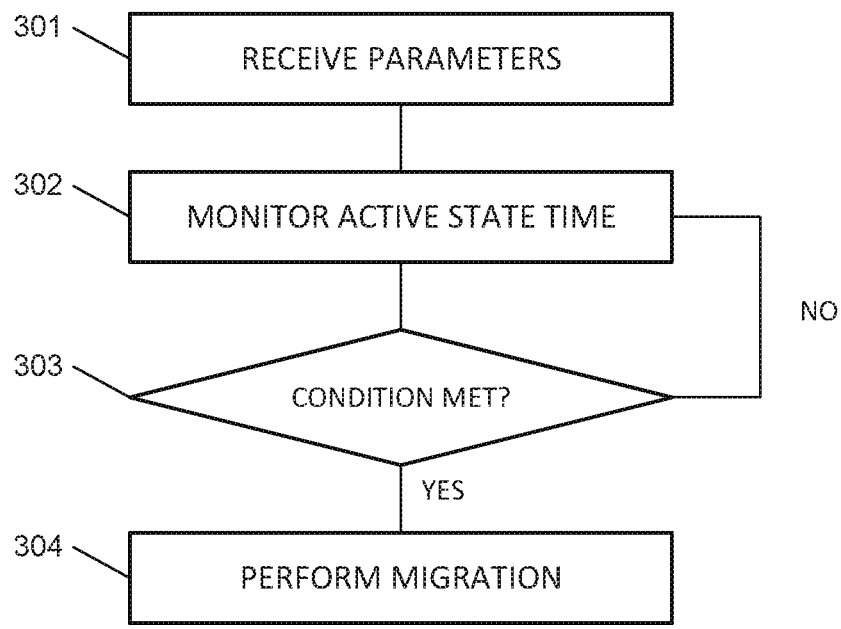
FIG. 3 illustrate an example of core migration based on activity time.

In some implementations, the time that an active core has spent in the active state may trigger a core migration. For example, time spent in a particular state may be a sufficient proxy for temperature. As another example, in a system where the main thermal concern is hotspots, core rotation based on time may prevent those from forming. FIG. 3 illustrate an example of core migration based on activity time.

The example method includes block 301. In block 301, operational parameters are received. For example, the parameters may be received from a BMC during system boot. The parameters may include the length of time each core is allowed to be active before rotating. In some cases, different operational states may have different allowed times. For example, each P state may have threshold time before rotation. As another example, different time periods may be provided for different instruction types. For example, a first length may be used when a core is executing predominately scalar instructions and a second length may be used when a core is executing predominately vector instructions.

In some implementations, block 301 may include receiving updated parameters during system operation. For example, during system operation there may be a hot add or removal of processor cores. For example, block 201 may include receiving core addition or removal commands from the OS. In these examples, the number of active and idle cores may be updated to reflect the hot add or removal of cores. Commands to update the numbers of active or idle cores may be received from the OS, out-of-band management processor, may be determined programmatically, or through other methods.

The example method further includes block 302. In block 302, the time for each active core has been active is monitored. In implementations where different activity types have different migration periods, block 302 may include collecting data regarding the activity type of each core.

The example method further includes block 303. In block 303, it is determined whether any active core has been active for a threshold length of time. If so, then the method proceeds to block 304 to perform a core migration as described with respect to FIG. 1.

Figure 4:
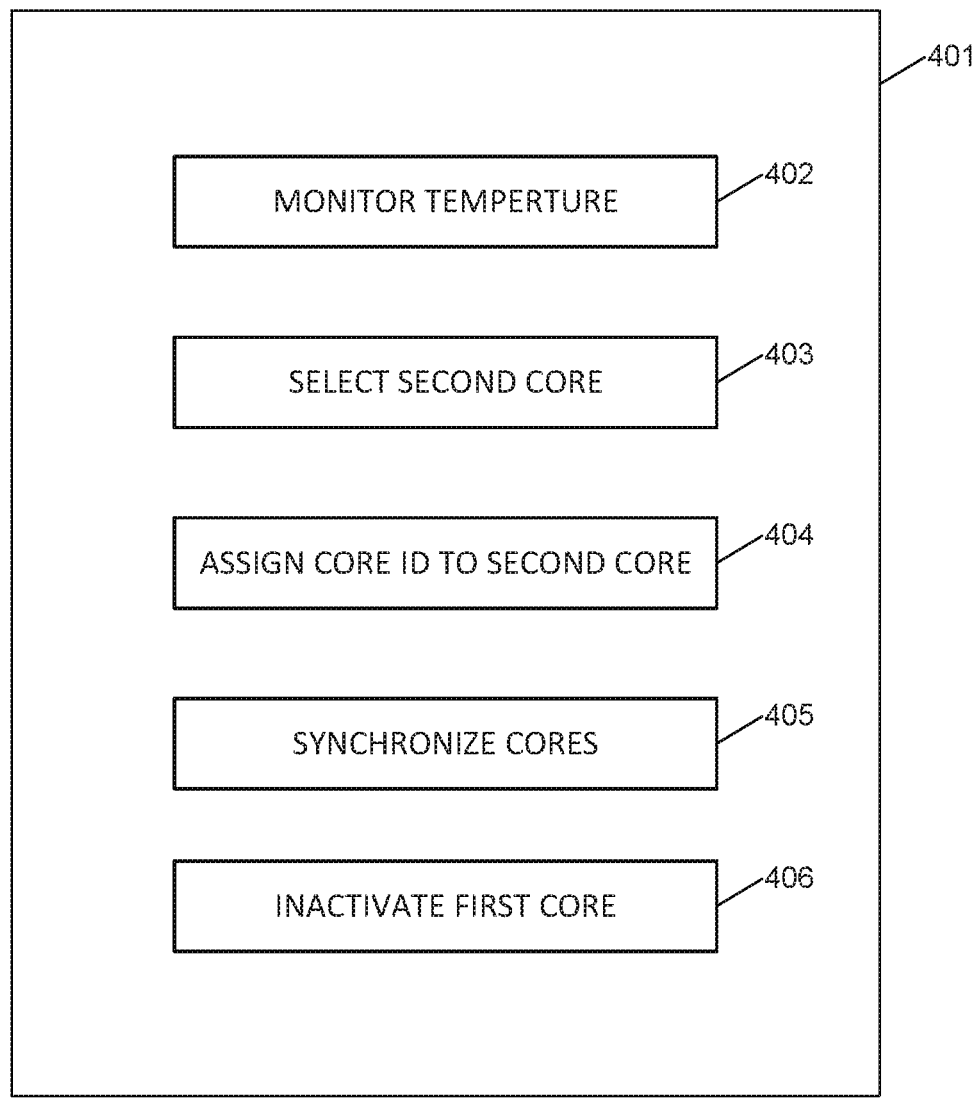
FIG. 4 illustrates an example non-transitory computer readable medium storing instructions.

FIG. 4 illustrates an example non-transitory computer readable medium 401 storing instructions 402-403. For example, the instructions may be firmware instructions stored on one or more system agents performing core migration. As another example, the instructions may be firmware instructions stored on a non-transitory computer readable medium prior to installation.

The example medium 401 stores a first set of instructions 402. Instructions 402 may include instructions to monitor a first core. For example the instructions 402 may be executable by a controller to monitor the temperature of the cores as described with respect to block 202 of FIG. 2. As another example, the instructions 402 may executable by the controller to monitor an activity period of the first fore as described with respect to block 302 of FIG. 3.

The medium 401 stores a second set of instructions 403. Instructions 403 may be executable to select a second core from a set of idle cores based on a selection condition. For example, the selection condition may be if the first core temperature exceeds a threshold. As another example, the selection condition may be if the first core has been active for a threshold length of time. In some implementations, instructions 403 further include instructions to select the second core from the set of idle cores based on at least one of distance between the second core and the first core and a temperature of the second core. For example, the instructions 403 may be executable to select the idle core as described above with respect to block 102 of FIG. 1. In further implementations, instructions 403 may include instructions to receive the threshold temperature and the size of the set of idle cores from a management controller.

The medium 401 stores a third set of instructions 404. Instructions 404 may be executable by the controller to assign the core ID of the first core to the second core. For example, the instructions 404 may be executable to cause the controller to perform block 102 of FIG. 1.

The medium 401 stores a fourth set of instructions 405. Instructions 405 may be executable by the controller to synchronize the first and second cores. For example, the instructions 405 may include instructions synchronize the first core and the second core by issuing a save state command to the first core prior to activating the second core.

The medium 401 stores a fifth set of instructions 406. Instructions 406 may be executable to place the first core into an inactive state. For example, the instructions 406 may be executable to place the core into a C6 power state after the cores are synchronized. The instructions 406 may be further executable to place the first core into the set of idle cores after placing the first core into the inactive state.

Figure 5:
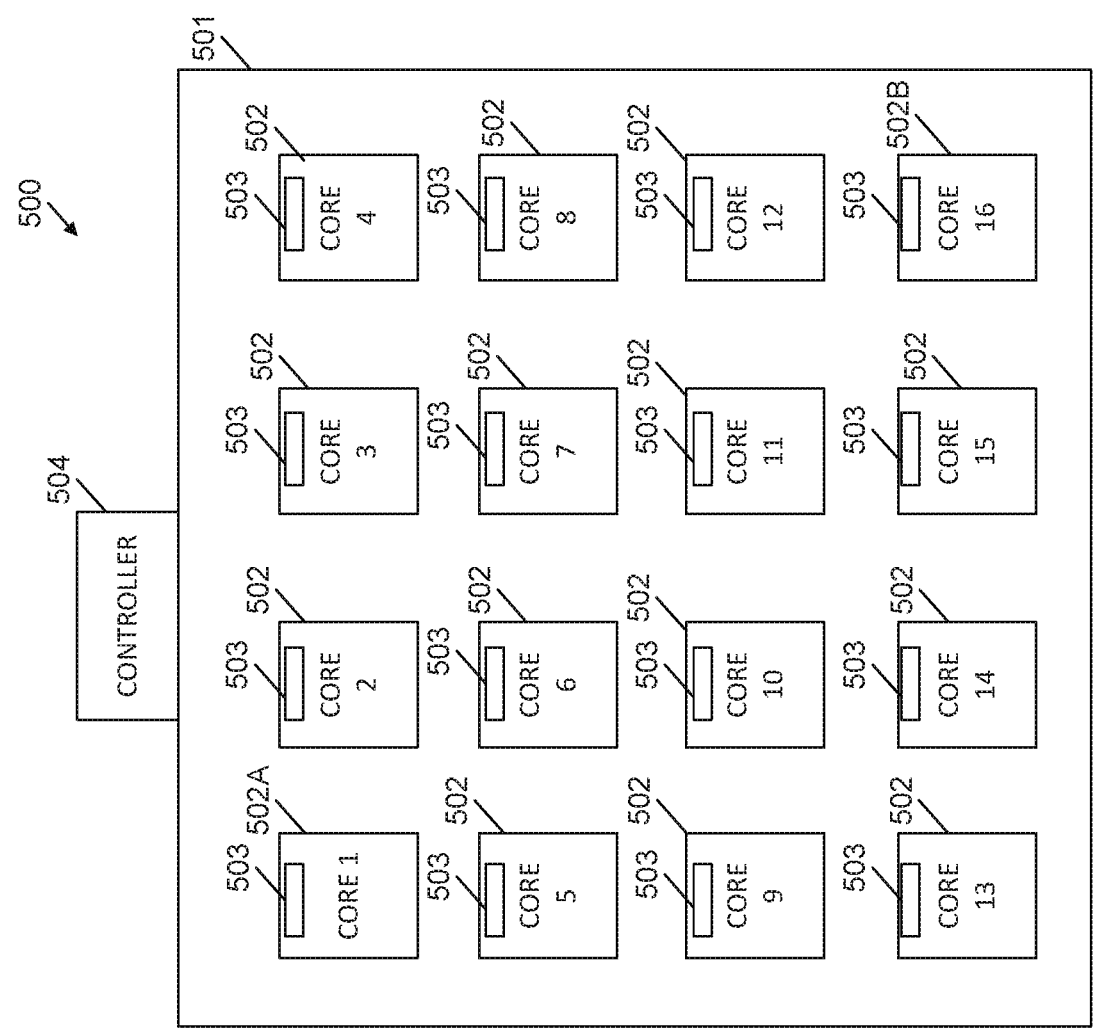
FIG. 5 illustrates an example system including a multi-core processor and a controller to perform core migration.

FIG. 5 illustrates an example system 500 including a multi-core processor 501 and a controller 504 to perform core migration.

The processor 501 includes a plurality of cores 502 and a plurality of temperature sensors 503 In the illustrated example, each core 502 has a corresponding temperature sensor 503. However, in other implementations, each core 502 may have multiple temperature sensors 503 or the temperature sensors 503 may be dispersed such that each core 502 does not have its own corresponding sensor 503.

The system further includes a controller 504. In some implementations, the controller 504 may be an element of the processor 501. For example, the controller 504 may be a PCU or other on-processor agent. In other implementations, the controller 504 is separate from the processor 504. For example, the controller 504 may be a management engine connected to the processor 504 through an out of band interface.

The controller 504 may execute firmware to perform process or thread migration on the cores 502 of the processor 501. For examples, the controller may perform the methods of FIGS. 1-3 and execute the firmware of FIG. 4.

In an example implementation, the controller 504 receives temperature data from each of the plurality of temperature sensors 503 and uses the data to generate a temperature profile of the cores 502.

The controller 504 uses the temperature profile to identify an active core 502A for migration. For example, the controller 504 may identify the core for migration based on the core 502A exceeding a programmed temperature threshold.

The controller 504 identifies an idle core 502B for migrating the process or thread of the core 502A. For example, the controller may select the idle core 502B a set of idle cores based on at least one of distance between the idle core and the active core or temperature of the idle core. In some implementations, the controller 504 may receive the number of allowable active cores and the size of the set of idle cores as provided parameters. For example, the controller 504 may receive the parameters from a BMC or other out-of-band management controller during system initialization.

After identifying the idle core 502B, the controller 504 assigns the core identifier of the active core 502A to the idle core 502B. The controller 504 allows the cores to synchronize and inactivates the previously active core 502A, then assigns core 502A as idle core or part of set of idle cores. For example, the controller may trigger core synchronization by issuing a save state command to the active core prior to assigning the core identifier of the active core to the idle core.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

The invention claimed is:

1. A method, comprising:
   issuing a save state command to an active core, the active core having a core identifier;
   in response to the save state command, storing an architectural state and private cache contents of the active core in a shared location;
   assigning the core identifier to an idle core to map the idle core to the shared location and placing the idle core into an active state such that the active core and the idle core are simultaneously in the active state while having the same core identifier;
   issuing same program instructions to both the active core and the idle core in the active state to synchronize the active core and the idle core;
   waiting for the active core and the idle core to synchronize by waiting for the active core and the idle core to have a same program counter; and
   after the active core and the idle core have synchronized, placing the active core into an inactivate state.

2. The method of claim 1, further comprising:
   determining that the active core meets a threshold temperature condition; and
   issuing the save state command based on the determination.

3. The method of claim 2, wherein the step of determining comprises reading a temperature from a temperature sensor located on the active core.

4. The method of claim 2, wherein the step of determining comprises estimating the temperature of the active core using a readings from a plurality of on-processor temperature sensors and processor layout information.

5. The method of claim 1, determining that the active core has been active for a threshold length of time; and
   issuing the save state command based on the determination.

6. The method of claim 1, further comprising selecting the idle core from a set of idle cores based on at least one of distance between the idle core and active core and a temperature of the idle core.

7. The method of claim 6, further comprising receiving the number of idle cores for the set of idle cores from a management controller.

8. The method of claim 1, further comprising assigning the core identifier to the idle core by writing the core identifier of the active core to an identifier register of the idle core.

9. A non-transitory computer readable medium storing instructions to:
   monitor a temperature of a first core, the first core having a core identifier;

select a second core from a set of idle cores if the first core temperature exceeds a threshold;

assign the core identifier to the second core and place the second core into an active state such that the active core and the idle core are simultaneously in the active state while having the same core identifier;

synchronize the first core and the second core by mapping the state of the first core onto the second core and operating the first and second cores with the same program instructions; and place the first core into an inactive state after the first core and the second core have synchronized by having a same program counter.

10. The non-transitory computer readable medium of claim 9 storing further instructions to place the first core into the set of idle cores after placing the first core into the inactive state.

11. The non-transitory computer readable medium of claim 9 storing further instructions to synchronize the first core and the second core by issuing a save state command to the first core prior to activating the second core.

12. The non-transitory computer readable medium of claim 9 storing further instructions to select the second core from the set of idle cores based on at least one of distance between the second core and the first core and a temperature of the second core.

13. The non-transitory computer readable medium of claim 9 storing further instructions to receive the threshold temperature and the size of the set of idle cores from a management controller.

14. A system, comprising:
a processor comprising a plurality of cores and a plurality of temperature sensors, each core having a register to store a core identifier;
a controller to:
receive temperature data from each of the plurality of temperature sensors;
generate a temperature profile of the cores using the temperature data;
identify an active core for migration based on the temperature profile;
assign the core identifier of the active core to an idle core and place the idle core into an active state such that the active core and the idle core are simultaneously in the active state while having the same core identifier;
determine that the active core and the idle core are synchronized, wherein the active core and the idle core as synchronized by operating the active core and the idle core with the same program instructions; and
inactivate the active core after the active core and the idle core are synchronized by having a same program counter.

15. The system of claim 14, wherein the controller is an element of the processor.

16. The system of claim 14, wherein the controller is to select the idle core from a set of idle cores based on at least one of distance between the idle core and the active core or temperature of the idle core.

17. The system of claim 16, wherein the controller is to receive a number of allowable active cores and a size of the set of idle cores.

18. The system of claim 14, wherein the controller is to trigger synchronization between the active core and the idle core before inactivating the active core.

19. The system of claim 18, wherein the controller is to trigger synchronization between the active core and the idle core by issuing a save state command to the active core prior to assigning the core identifier of the active core to the idle core.

* * * * *